United States Patent
Morys

(10) Patent No.: US 10,670,736 B2
(45) Date of Patent: Jun. 2, 2020

(54) SPECTRAL GAMMA RAY DOWNHOLE LOGGING TOOL

(71) Applicant: PetroMar Technologies, Inc., Exton, PA (US)

(72) Inventor: Marian Morys, Exton, PA (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 0 days.

(21) Appl. No.: 16/104,451

(22) Filed: Aug. 17, 2018

(65) Prior Publication Data

US 2020/0057173 A1  Feb. 20, 2020

(51) Int. Cl.
| | |
|---|---|
| *G01V 5/10* | (2006.01) |
| *G01T 1/00* | (2006.01) |
| *G01V 5/00* | (2006.01) |
| *G01V 5/04* | (2006.01) |
| *G01T 1/40* | (2006.01) |

(52) U.S. Cl.
CPC ............ *G01T 1/00* (2013.01); *G01T 1/40* (2013.01); *G01V 5/00* (2013.01); *G01V 5/04* (2013.01)

(58) Field of Classification Search
CPC .... G01V 5/00; G01V 5/04; G01T 1/00; G01T 1/40
See application file for complete search history.

(56) References Cited

U.S. PATENT DOCUMENTS

| | | | | |
|---|---|---|---|---|
| 5,360,975 A | * | 11/1994 | Stoller | G01V 5/04 250/261 |
| 5,413,179 A | * | 5/1995 | Scott, III | E21B 43/267 166/250.12 |
| 5,461,230 A | * | 10/1995 | Winemiller | G01V 5/04 250/261 |
| 5,600,135 A | * | 2/1997 | Jacobson | G01T 1/40 250/261 |
| 9,702,990 B2 | * | 7/2017 | Mickael | G01T 1/2018 |
| 2007/0284518 A1 | * | 12/2007 | Randall | G01T 7/005 250/261 |
| 2009/0157341 A1 | * | 6/2009 | Cheung | E21B 47/022 702/85 |
| 2011/0025525 A1 | * | 2/2011 | Akimov | G01V 11/00 340/853.2 |
| 2015/0345283 A1 | * | 12/2015 | Switzer | E21B 47/024 73/152.54 |

\* cited by examiner

*Primary Examiner* — Kiho Kim
(74) *Attorney, Agent, or Firm* — Enrique Abarca; Abel Schillinger, LLP

(57) ABSTRACT

A variety of applications can include a gamma ray downhole logging system having a gamma ray detector, where temperature sensitivity of the gamma ray detector is accounted for in the operation of the logging system. Correction of sensitivity of the gamma ray detector can include using a measure of sensitivity drift derived from temperature binned gamma ray spectra from measurements by the gamma ray detector over a calibration period for a number of calibration periods. Additional apparatus, systems, and methods are disclosed.

23 Claims, 13 Drawing Sheets

SPECTRAL GAMMA RAY DOWNHOLE LOGGING TOOL

FIELD OF THE INVENTION

The present invention relates to gamma ray spectral measurements, in particular, to downhole logging tools using spectral gamma ray instrumentation.

BACKGROUND

Spectral gamma ray sensors allow measurement of energy spectrum of incoming gamma ray radiation. In particular, in downhole logging, the spectrum of naturally occurring gamma rays allows for an estimation of concentration of naturally occurring radioactive isotopes in the formation around a borehole, such radioactive isotopes as uranium (U), thorium (Th), and potassium (K). This estimation, in turn, provides useful information for petrophysical analysis of the formation.

Spectral gamma sensors commonly contain components that are highly sensitive to temperature and experience gradual change of sensitivity with time. Examples of such components are scintillators converting the incoming gamma ray photons to visible light, photomultiplier tubes (PMTs) converting visible light photons to a pulse of electrical energy, and electronic acquisition systems that subsequently record the resulting pulse for analysis. These components show some degree of sensitivity drift due to temperature and aging with time. In particular, the PMTs exhibit relatively rapid sensitivity drop with temperature. There are two mechanisms of temperature sensitivity in photomultiplier tubes. A first mechanism is an immediate and reversible drop in PMT sensitivity with temperature. A second mechanism is related to a cumulative exposure time to high temperature and is non-reversible, where the PMT continues losing its sensitivity. Such permanent loss of sensitivity is measurable in just tens to hundreds of operating hours, when exposed to high temperatures present in downhole logging environment.

The amplitudes of the electrical pulses produced in spectral gamma ray sensors are a function of the energies of incoming gamma ray photons. Usually, a close-to-proportional relationship between the energy of incoming gamma photon and the amplitude of the resulting electrical pulse is observed. Therefore, in order to acquire accurate gamma ray spectrum, the sensitivity of the entire system should be stable with changing environment and with time.

Use of measured adjustment data can provide a stabilization to the measured data of a sensor. One of the practices for stabilization of the system sensitivity common in the industry is the inclusion of a weak radioactive calibration source inside the tool. Such a source emits gamma photons with a known constant energy producing a distinct radiation peak in the acquired spectrum. Such a peak of known energy can allow for correction of the sensitivity drifts due to any reason. There are some serious drawbacks of the inclusion of radioactive source inside a logging tool, including the added cost of managing safety and regulatory requirements, export controls that, in some cases, prohibit transport of tools containing radioactive sources, and a distortion of the measured spectrum, which is the superposition of the reference source radiation and the radiation of interest.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
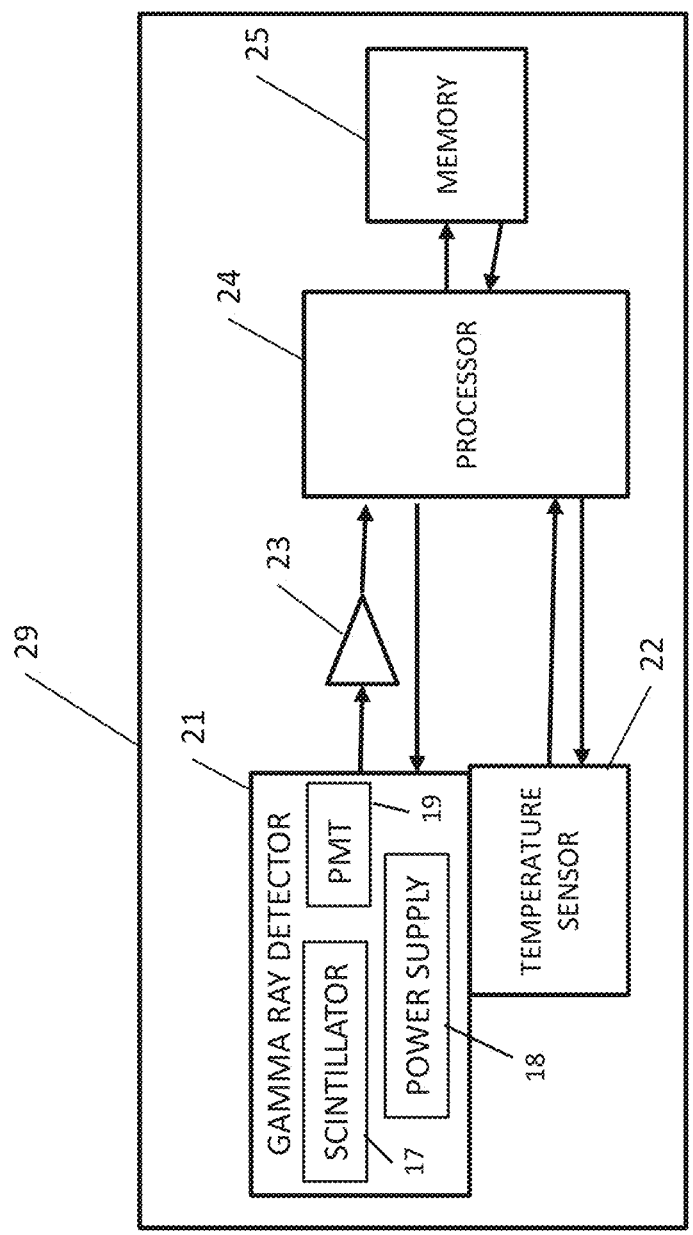
FIG. 1 is a block diagram of an example spectral gamma measuring instrument to measure the spectrum of incoming gamma ray radiation, in accordance with various embodiments.

In various embodiments, sensitivity stabilization of a downhole spectral gamma ray logging tool can be attained based on correction factors derived from analysis of gamma ray spectra data binned by temperature and binned by measured pulse amplitude. Use of multiple correction factors can address the issues associated with both reversible temperature-dependent sensitivity and non-reversible temperature-dependent sensitivity of a component of the downhole spectral gamma ray logging tool. The correction factors can be used to adjust the measured data to provide the sensitivity stabilization for the downhole spectral gamma ray logging tool FIG. 1 is a block diagram of an embodiment of an example spectral gamma measuring instrument 29 to measure the spectrum of incoming gamma ray radiation. Spectral gamma measuring instrument 29 can be arranged as a gamma ray downhole logging system. The block diagram provides a functional diagram of a gamma ray detector, which may also be referred to as a spectral gamma ray sensor. Spectral gamma measuring instrument 29 can comprise a gamma ray detector 21 thermally coupled with a temperature sensor 22. Temperature sensor 22 can be selected to measure the temperature of gamma ray detector 21 with high accuracy, for example within a typical range of 1-2° C. of the component being directly measured. Gamma ray detector 21 can be implemented as one or more gamma ray detectors. Gamma ray detector 21 can comprise a scintillator 17 and a photomultiplier tube 19 with a high voltage power supply 18. Scintillator 17 can be a sodium iodide thallium (NaI(Tl)) crystal. A NaI(Tl) scintillation detector is typically provided as a scintillation detector using sodium iodide doped with thallium. Alternative implementations for scintillator 17 may include organic or inorganic scintillators, gas filled tubes, and semiconductor devices that are well known to those skilled in the art. Electrical pulses induced by gamma ray photon capture in gamma ray detector 21 can be amplified and shaped by an amplifier 23 and then further evaluated with a processor 24.

Figure 4:
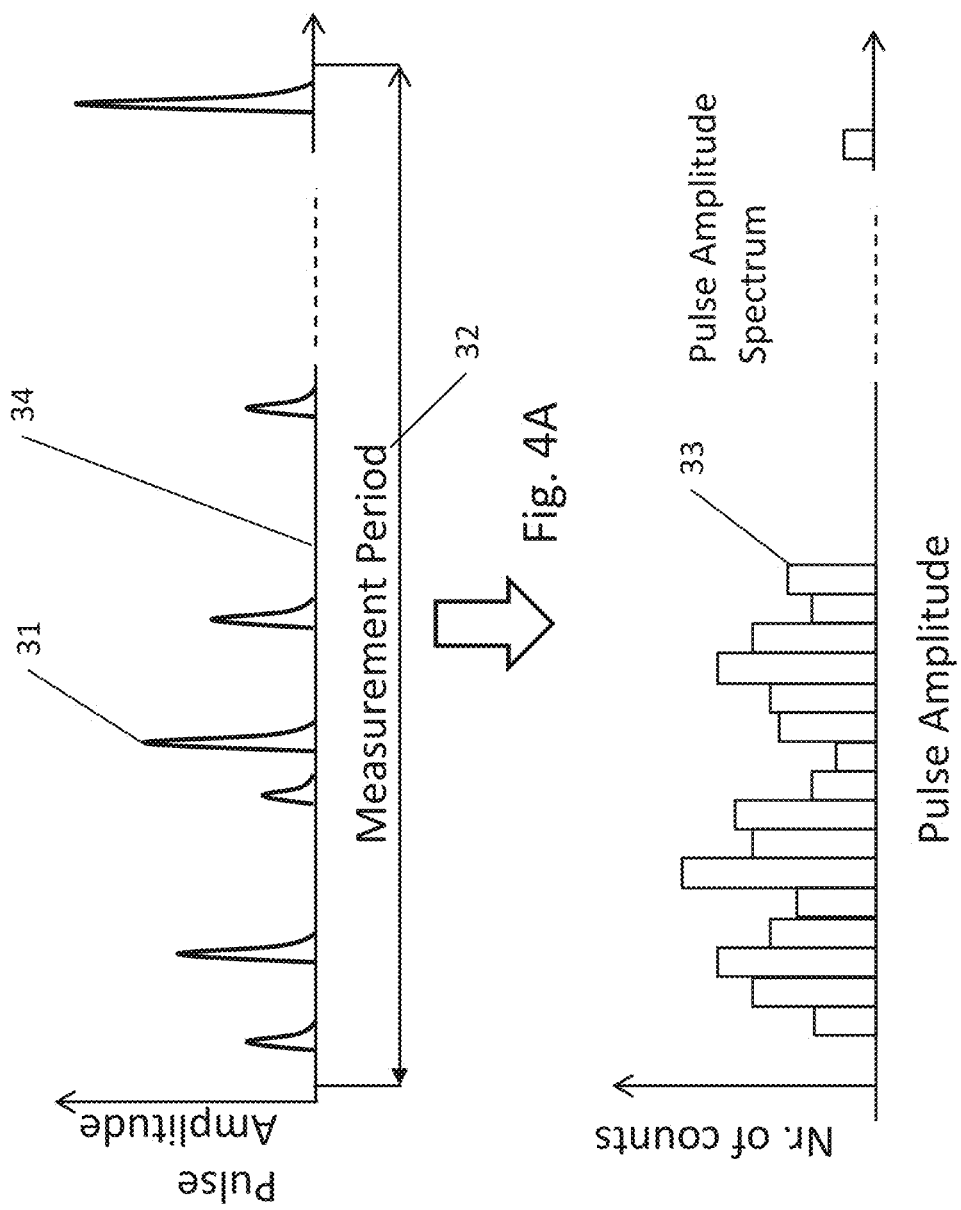
FIGS. 4A-4B illustrate an example process of acquisition of pulse amplitude spectrum, in accordance with various embodiments.

Processor 24 can be communicatively coupled to a memory 25. Memory 25 can store instructions executed by processor 24 to evaluate the electrical pulses provided by the gamma ray detector 21. Data for the gamma ray detector 21 and data from the evaluation of the output of the gamma ray detector 21 can be stored in memory 25. An example of measured electrical pulses for processing is shown in FIG. 4 as an electrical pulse 31 whose amplitude is measured from a baseline 34. Processor 24 in conjunction with memory 25 can be arranged to provide control signals to the spectral gamma measuring instrument 29 and the temperature sensor 22 in addition to receiving from these instrumentalities spectra data and temperature data, respectively. For example, processor 24 in conjunction with memory 25 can control the high voltage power supply 18 to adjust the power provided to photomultiplier tube 19.

Spectral gamma ray processing can involve measurement of the amplitude of each electrical pulse produced by conversion of a photon in the detection of gamma rays. Measurement of the pulse amplitude can be accomplished by a series of analog comparators or by directly sampling the output of amplifier 23 by an analog to digital converter and detecting the pulse amplitudes in digital domain by using commonly known peak detection methods. The pulse amplitude determination may further involve analog or digital filtering of the signal, elimination of baseline drifts by accounting for any shifts baseline level 34, or charge integration. Such methods can improve signal to noise ratio and resolution of the pulse amplitude measurement. All suitable methods of measurement of total pulse energy, charge, or peak voltage are herein referred to as measurement of pulse amplitude. Memory 25 in addition to storing data can be configured with other components to readout data and/or one or more analyses to a computer external to spectral gamma measuring instrument 29.

Processor 24 can be realized as one or more processors. Memory 25 can be implemented having stored instructions, executable by the one or more processors, to perform operations in the spectral gamma measuring instrument 29 on electrical signals generated by the spectral gamma measuring instrument 29. The operations can include operations to make a correction of sensitivity of the gamma ray detector using a measure of sensitivity drift derived from temperature binned gamma ray spectra from measurements of the gamma ray spectra by the gamma ray detector over a calibration period for a number of calibration periods. A calibration period is a period that data can be collected including during operation of the tool. The operations can include operations to make a correction of reversible temperature effect of sensitivity of the gamma ray detector using a temperature correction lookup table. A correction of reversible temperature effect may be made as an initial correction corresponding to the reversible temperature effect associated with the gamma ray detector after adjustment for a temperature lag between the gamma ray detector and the temperature sensor used in the measurement.

The operations from processor 24 executing instructions of memory 25 can include operations to record the measured gamma ray spectra as histograms of gamma ray pulse counts versus amplitudes of recorded gamma ray pulses over a measurement period and record calibration spectra as two-dimensional histograms of counts of the recorded gamma ray pulses versus the amplitudes of the pulses and sensor temperature over the calibration period. Memory 25 can include a non-volatile memory to store data for the histograms. The operations can include operations to periodically calculate the measure of sensitivity drift derived from temperature binned gamma ray spectra while the system is logging downhole. Calculation of a measure of sensitivity drift can be made by an analysis of a radiation peak of potassium 40 isotope present inside the gamma ray detector.

In various embodiments, operations from processor 24 executing instructions of memory 25 can include operations to combine the gamma ray spectra with pre-determined calibration constants to obtain concentration of at least one naturally occurring radioactive element in a formation around a borehole with the gamma ray detector disposed in the borehole. The concentration of the at least one naturally occurring radioactive element can be realized as a measurement as a function of depth within the borehole. The concentration of the at least one naturally occurring radioactive element can be realized as a measurement as a function of azimuthal sector around the borehole.

Figure 2:
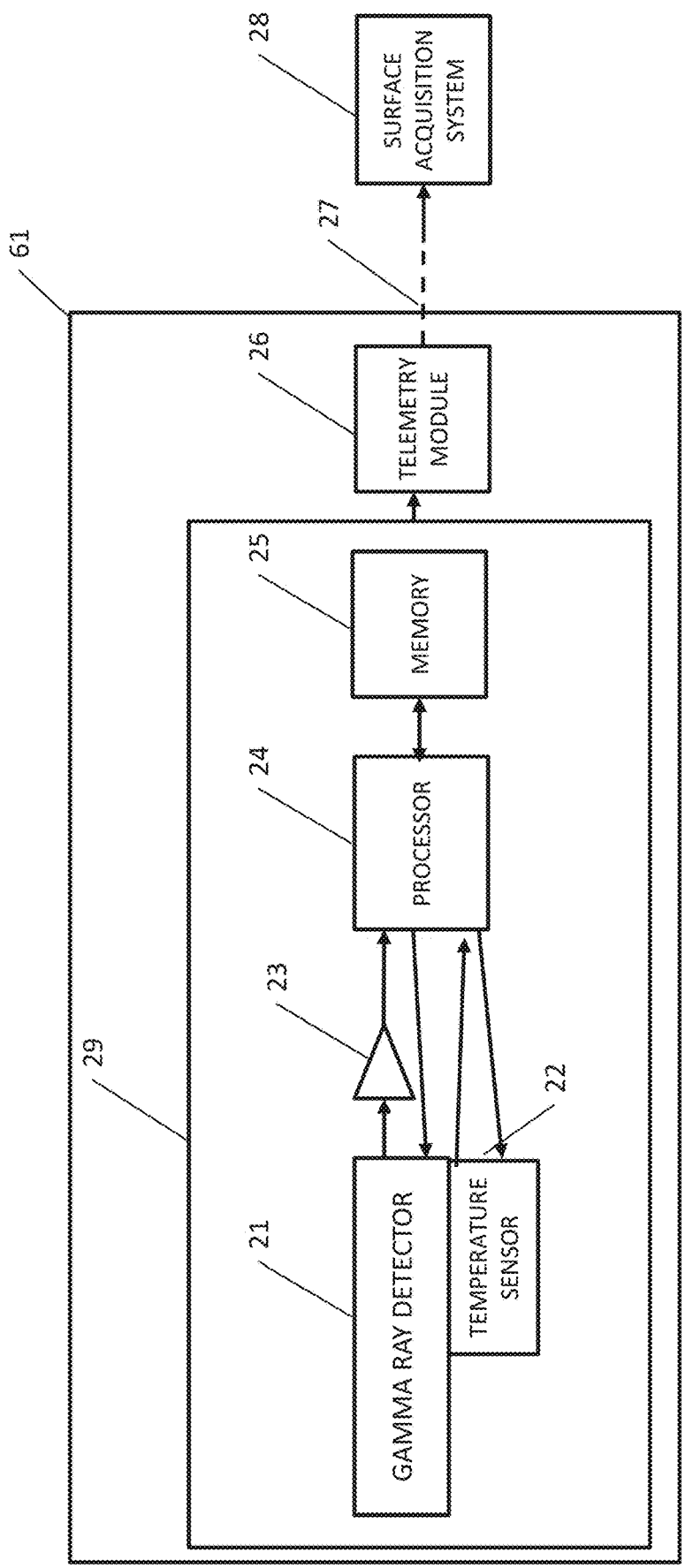
FIG. 2 illustrates an example of the spectral gamma measuring instrument of FIG. 1 disposed in a downhole spectral gamma logging tool, in accordance with various embodiments.

FIG. 2 illustrates an embodiment of an example of spectral gamma measuring instrument 29 of FIG. 1 disposed in a downhole spectral gamma logging tool 61. For ease of presentation, scintillator 17, photomultiplier tube 19, and power supply 18 of spectral gamma measuring instrument 29 are not shown. In addition to spectral gamma measuring instrument 29, downhole spectral gamma logging tool 61 can include a telemetry module 26 to communicate to a surface acquisition system 28. Telemetry module 26 can be realized as a communication interface to provide real time communication of the gamma ray spectra to a surface acquisition system. Data and/or one or more analyses from memory 25 can be provided to telemetry module 26 allowing for communication of the data and/or one or more analyses to a surface acquisition system 28 for further processing. A communication channel 27 from telemetry module 26 to surface acquisition system 28 can be wired, such as used in wireline logging, or wireless, such as mud pulsing or electromagnetic as commonly used in loggingwhile-drilling (LWD) tools. Surface acquisition system 28 can collect the data from downhole spectral gamma logging tool 61 and can provide a mechanism for analysis and visualization at the surface. Surface acquisition system 28 can include one or more processors and memory to execute instructions stored in the memory of surface acquisition system 28 to perform operations to calculate the measure of sensitivity drift derived from temperature binned gamma ray spectra as an alternative to the analysis performed in spectral gamma measuring instrument 29 or in conjunction with the analysis in spectral gamma measuring instrument 29.

Figure 3:
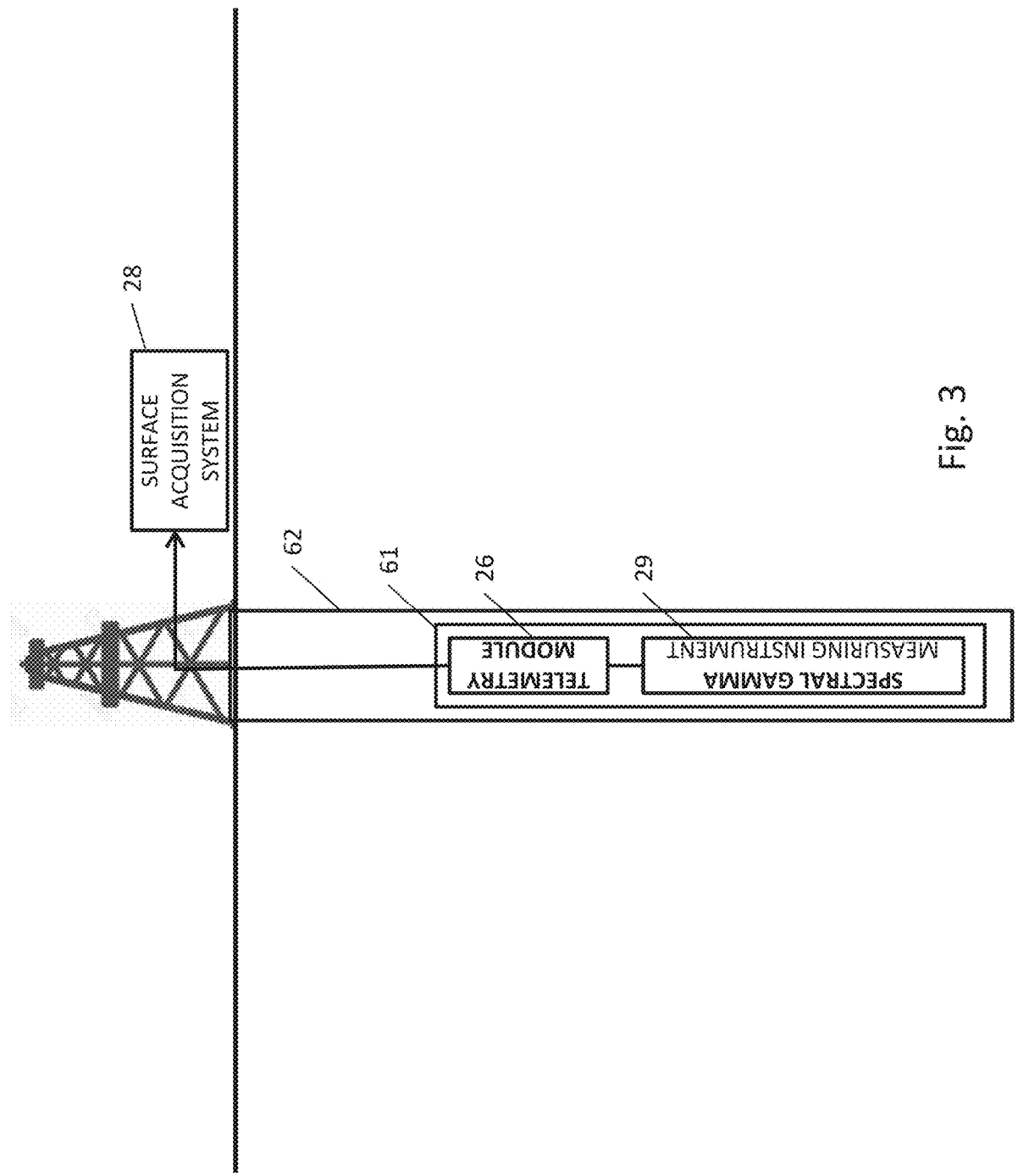
FIG. 3 shows an example of the downhole spectral gamma logging tool of FIG. 2 in a borehole that penetrates the Earth formation, in accordance with various embodiments.

FIG. 3 shows downhole spectral gamma logging tool 61 of FIG. 2 in a borehole 62 that penetrates the Earth formation. For ease of presentation, the internal components of downhole spectral gamma logging tool 61 are not shown. Downhole spectral gamma logging tool 61 is typically contained in a housing protecting it from the borehole environment. In a wireline system, downhole spectral gamma logging tool 61 may be suspended on a wireline and the data collected while the tool is logged along borehole 62. In a LWD system, downhole spectral gamma logging tool 61 can be a part of a drillstring assembly, with downhole spectral gamma logging tool 61 following a drill bit as the drilling operation progresses. Other applicable means of conveyance of downhole spectral gamma logging tool 61 in borehole 62 may be used, where such well known conveyance means may include coiled tubing, slickline, through-tubing, and pipe pushing.

FIGS. 4A-4B illustrates an embodiment of an example process of acquisition of pulse amplitude spectrum 33. The measurement can be performed over a measurement period 32 as shown in FIG. 4A, which can be in the range of one second to five minutes, depending on application and tool conveyance method. The amplitudes of pulses 31 detected in the measurement period 32 can be measured and binned as a function of their amplitude forming a histogram 33 also referred to as the pulse amplitude spectrum, as shown in FIG. 4B. The height of each bar in histogram 33 is proportional to the number of pulses with amplitude within each bar's amplitude range. This can be viewed as a process of spectral binning of spectral gamma ray acquisitions. For natural gamma ray logging tools, the full range of pulse amplitudes can be selected such that the pulse amplitudes correspond to gamma ray energies in the range of 50-150 eV on the low end and 2-5 MeV on the high end. The pulse amplitude spectrum can be subsequently converted into a gamma ray energy spectrum by application of a calibration factor and temperature corrections. The gamma ray energy spectrum can be then used for estimation of radioactive element content and petrophysical interpretation.

Figure 5:
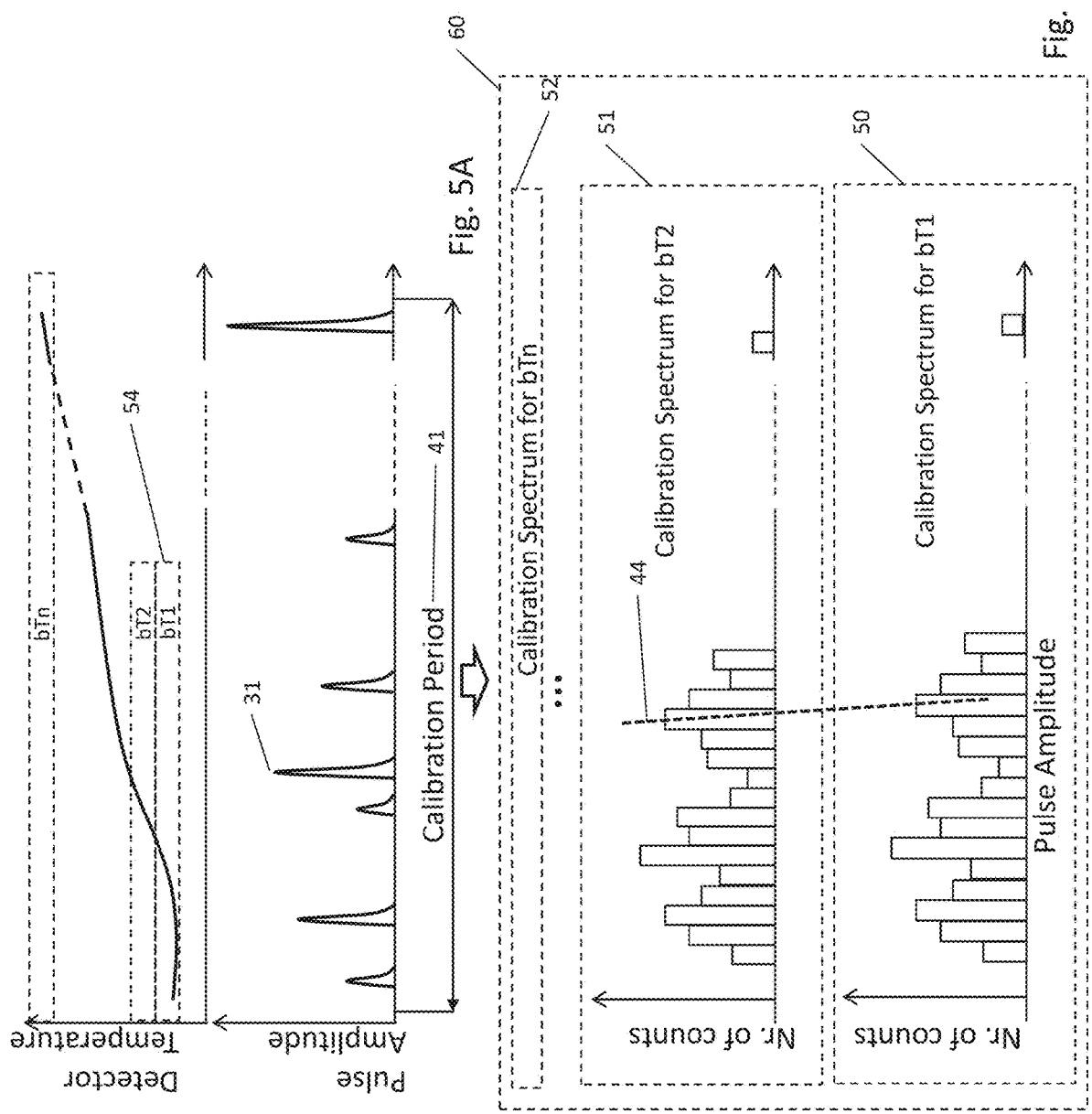
FIG. 5A illustrates an example process of temperature-binning of gamma ray spectra, in accordance with various embodiments.
FIG. 5B illustrates an example process of acquisition of a temperature binned calibration spectrum and a typical effect of temperature change on the acquired data, in accordance with various embodiments.

FIG. 5A illustrates an example process of temperature-binning of gamma ray spectra. A temperature binned calibration spectrum can be acquired over a calibration period 41, set as long as possible but such that within the calibration period the long term time drifts of the system sensitivity are still negligible. Calibration period 41 can be set within a range of 20 minutes to 100 hours, depending on application. Long acquisition time of a temperature binned calibration spectrum assures high number of gamma counts in the data set and consequently high resolution of the spectrum. The operating range of the tool, such as spectral gamma measuring instrument 29 of FIGS. 1-3, can be divided in temperature bands, referred to as bins bT1, bT2, . . . bTn labelled collectively as bins 54.

FIG. 5B illustrates an embodiment of an example process of acquisition of a temperature binned calibration spectrum 60 and an effect of temperature change on the acquired data. The process of generation of temperature binned calibration spectrum can be performed in parallel to the acquisition of pulse amplitude spectra 33 of FIG. 4B. The same pulses are used for generation of both spectra. Every pulse produced by a gamma ray detector, such as gamma ray detector 21, can be binned in both the pulse amplitude spectrum 33 of FIG. 4B and temperature binned calibration spectrum 60 of FIG. 5B. In the process of temperature binned calibration spectrum acquisition, the binning can be performed in two dimensions: the pulse amplitude and the detector temperature during the pulse detection. The number of bins 54 of FIG. 5A in the pulse amplitude dimension can be within the range of 128 to 2048. However, the temperature detection can use a number of bins 54 different from the range of 128 to 2048. Each gamma ray induced pulse is counted in a bin that corresponds to the pulse amplitude and the detector temperature, for example the temperature detected by temperature sensor of FIGS. 1 and 2, at the time of the pulse acquisition. Over the period of calibration period 41, this process can produce multiple calibration spectra (50, 51, . . . 52), one for each temperature band encountered during the measurement.

As the temperature of the gamma ray detector changes so does its sensitivity. The reversible thermal drift of the detector may be estimated at approximately $-0.4\%/°$ C. As a result, an increase of $10°$ C. in detector temperature would result in 4% drop in the amplitude of the detected pulses, resulting in effective shift of all pulses towards smaller amplitude. Line 44 in FIG. 5B illustrates such a change in the acquired spectrum, assuming constant source of the radiation. Loss of sensitivity results in a shift of all bins towards lower amplitudes by a multiplicative factor. In a system having more than one gamma ray detector, the binning process can be performed for each detector separately. The irreversible loss of sensitivity of the gamma ray detector can be superimposed over the reversible drift and can occur on a much slower time frame, tens of days to months, depending on sensor exposure.

Figure 6:
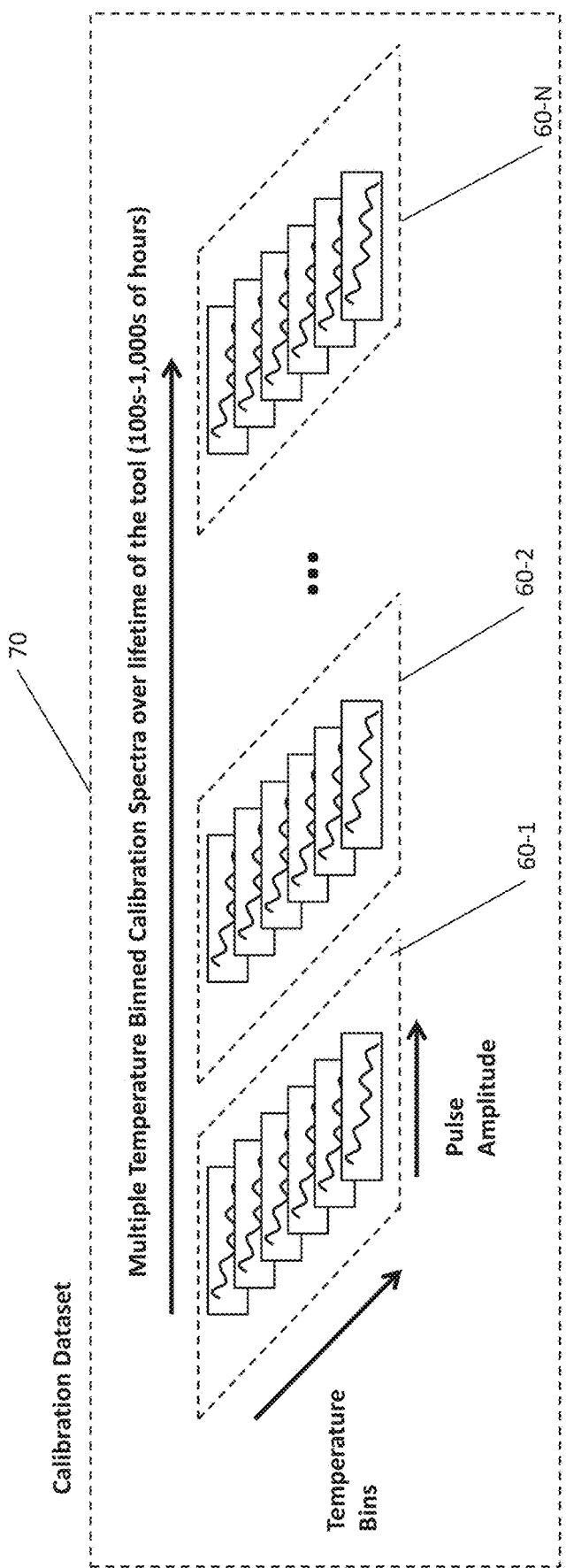
FIG. 6 illustrates an example process of acquiring multiple temperature-binned spectra for the purpose of determination of long term gain drift trends, in accordance with various embodiments.

FIG. 6 illustrates the acquisition of a calibration dataset 70. The calibration dataset 70 includes an array of multiple temperature binned calibration spectra 60-1, 60-2 . . . 60-N that may be acquired over a lifetime of the tool, which is often thousands of hours of operation, or at least since last factory calibration. Each one of temperature binned calibration spectra 60-1, 60-2 . . . 60-N are acquired at different times. For example, each one may be for a different day. The calibration dataset 70 contains an integrated history of pulse height spectra of the geological formations measured. Each individual temperature binned calibration spectrum 60-1, 60-2 . . . 60-N also reflects the temperature drift of the system sensitivity. To the extent temperature was changing during tool operation, the entire calibration dataset 70 also contains information about the long term sensitivity drift that occurred. Calibration dataset 70 is acquired over very long period of time during which such drifts do occur.

Analysis of information in a calibration dataset, such as calibration dataset 70, can be performed as the calibration dataset is being acquired. Such analysis can be implemented to determine the temperature and long term drift corrections for the downhole logging tool sensitivity. In various embodiments, the downhole logging tool sensitivity can be based on a component such as a spectral gamma ray detector of the downhole logging tool sensitivity.

A feature of the downhole logging tool is that it measures radiation produced predominantly by three elements: uranium, thorium, and potassium. Another feature of the downhole logging tool is that the long calibration acquisition time of the downhole logging tool results in averaging the variations in formations measured. These features allow for exploitation of the similarities of the gamma ray spectra to detect the sensitivity changes.

Figure 7:
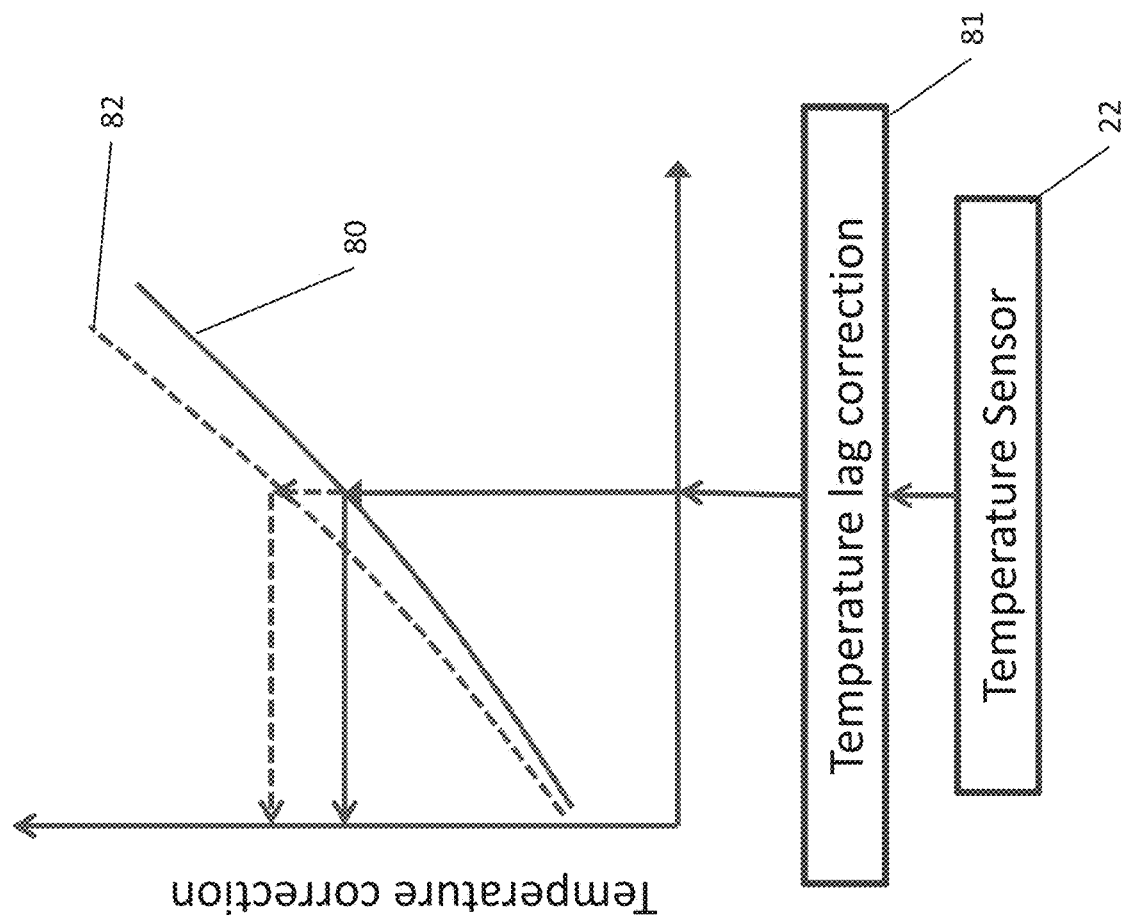
FIG. 7 illustrates an example process of correction of temperature effects on a spectral gamma ray detector, in accordance with various embodiments.

FIG. 7 illustrates an embodiment of an example process of correction of temperature effects on a spectral gamma ray detector. Temperature correction of a spectral gamma ray detector, such as spectral gamma ray detector 21 of FIGS. 1 and 2, can be performed in a procedure including two steps. A first step, illustrated in FIG. 7, includes the compensation of the reversible temperature effect by applying previously determined temperature correction curve 80. The temperature correction 80 can be from a temperature lookup table. A second step can include compensation of the long term irreversible sensitivity loss of the spectral gamma ray detector, such as spectral gamma ray detector 21 of FIGS. 1 and 2, by applying a gradual modification over time to the temperature lookup table that provided temperature correction curve 80. The modification of the lookup table can be based on the analysis of the trends of peak shifts in the temperature binned gamma ray spectra. Such analysis can be conducted using spectral analysis techniques. For example, as the spectral gamma ray detector ages the temperature correction coefficients would increase and the temperature correction curve 82 would be applied.

Initial determination of temperature correction 80 can be preformed during factory calibration of the spectral gamma ray detector in a controlled temperature environment and with an external weak radioactive source emitting gamma photons with known energy. In an embodiment, a weak Cs 137 source, where Cs 137 is a radioactive isotope of cesium with an atomic mass of 137, can be used in the calibration fixture. Other sources can be used. The distinct peak that Cs 137 produces in the acquired data as the spectral gamma ray detector is heated to its maximum operating conditions provides data for determination of the initial calibration lookup table. The lookup table can be represented as a polynomial or other mathematical expression representing the relationship between temperature and temperature correction coefficient for the spectral gamma ray detector.

As shown in FIG. 7, the output of a temperature sensor, such as temperature sensor 22 of FIGS. 1 and 2, can be operated on to provide a temperature correction. First, a temperature lag correction 81 can be applied to the measured temperature from temperature sensor 22 providing an effective temperature. It is at the effective temperature that correction curves 80 and 82 are applied to the pulse amplitude data. In an embodiment, the correction factor may be provided in a signal back to the gamma ray detector 21 to adjust the gamma ray detector 21, for example, by adjusting the output of power supply 18 to PMT 19. The correction curves 80 and 82 are correlated to the initial lookup table and the modified lookup table as discussed above.

Figure 8:
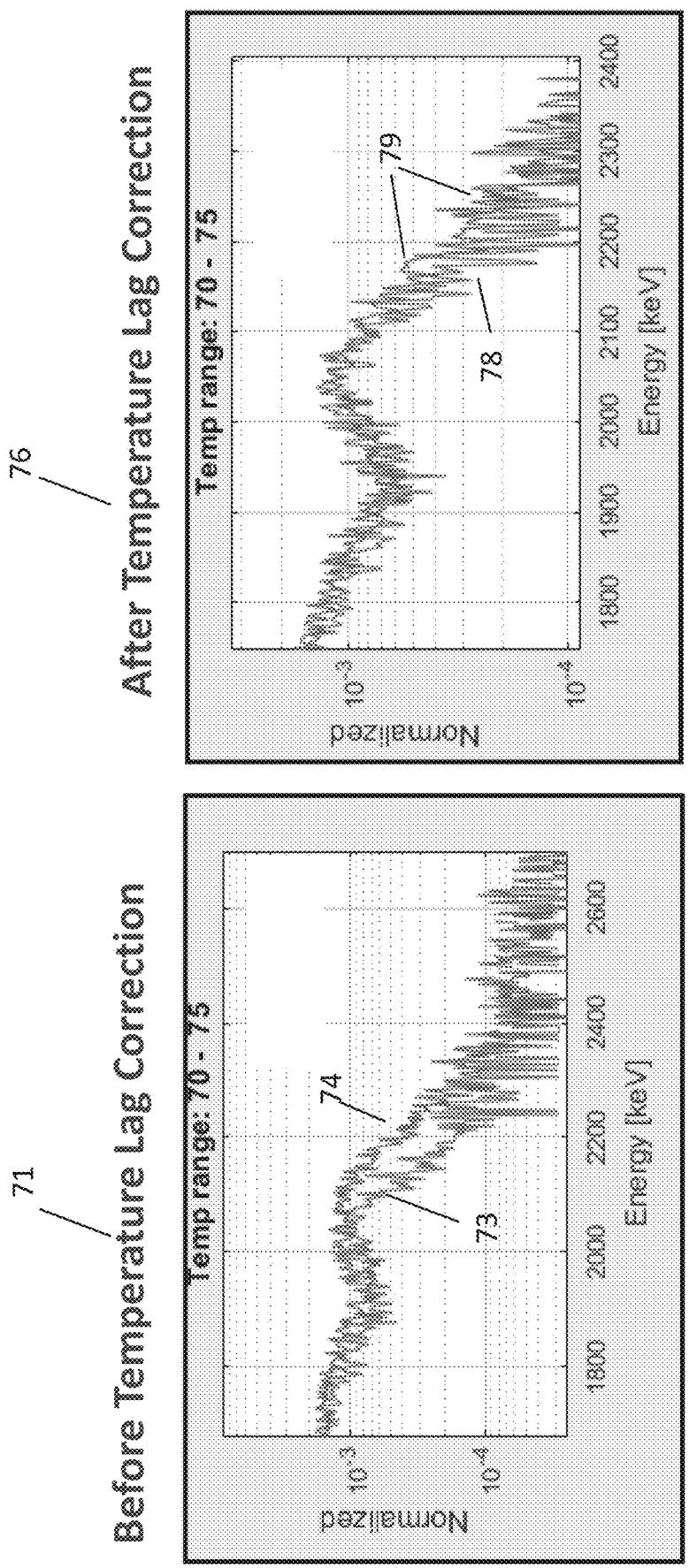
FIG. 8 is a comparison of temperature binned spectrum before and after temperature lag correction, in accordance with various embodiments.
Figure 9:
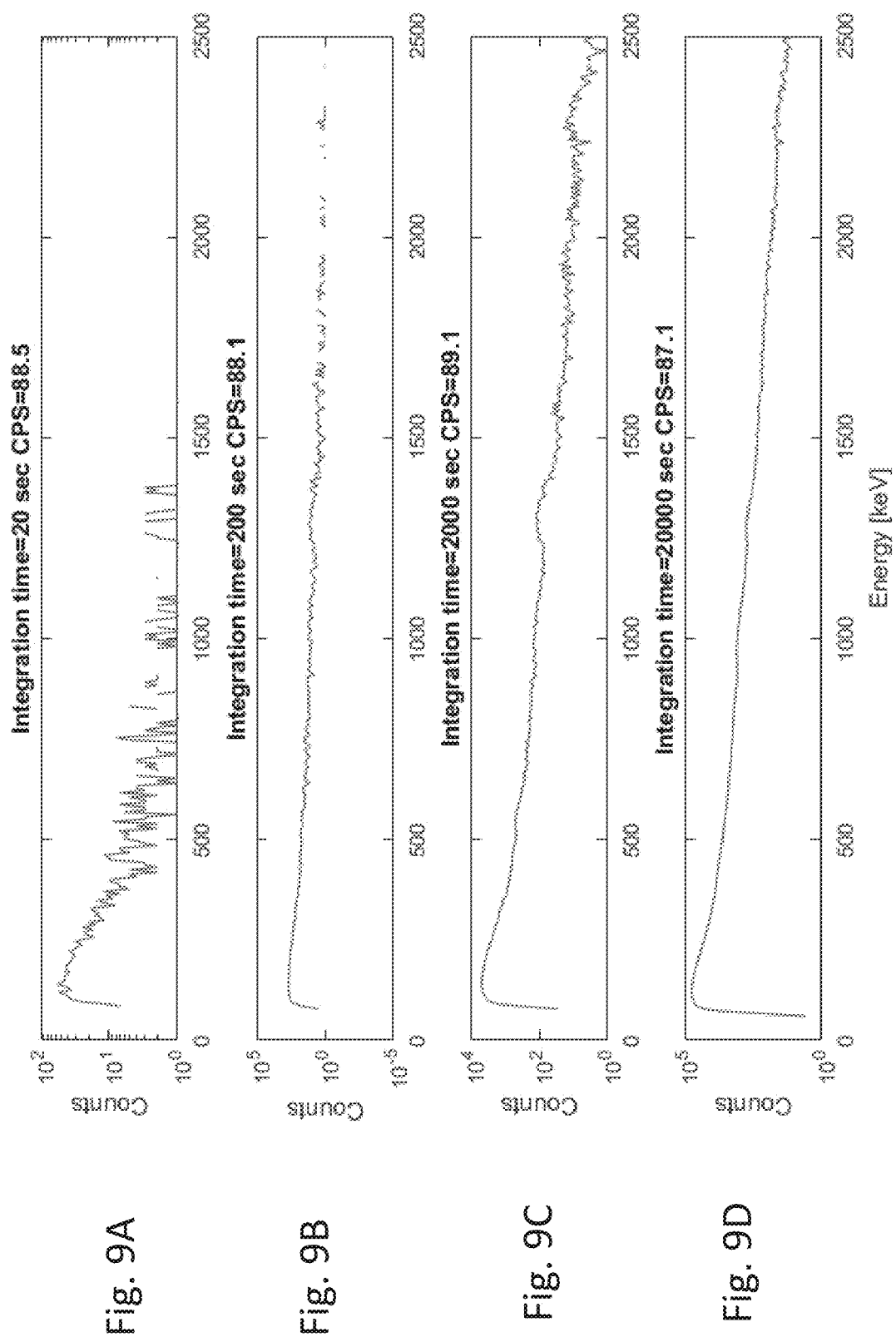
FIGS. 9A-9D illustrate the effect of acquisition time on the quality of acquired gamma spectra, in accordance with various embodiments.

As the internal temperature of the components of the spectral gamma ray detector may lag behind the temperature measured on the housing of the spectral gamma ray detector, the temperature lag correction 81 of FIG. 7 can be applied to the temperature from the temperature sensor 22, for example. FIG. 8 is a comparison of temperature binned spectrum before an after temperature lag correction. This comparison illustrates the effect of temperature lag correction on a non-temperature-corrected temperature binned spectrum acquired, while the spectral gamma ray detector was exposed to thermal cycling. In graph 71 before temperature lag correction was applied, curve 74 of the spectra measured during temperature rise (positive temperature slope) differed from those acquired during temperature falling cycle (negative temperature slope) shown in curve 73. In graph 76 after temperature lag correction was applied, curve 79 of the spectra measured during temperature rise (positive temperature slope) did not appreciably differ from those acquired during temperature falling cycle (negative temperature slope) shown in curve 78. Temperature lag correction resulted in effective elimination of the difference due to temperature slope changes. The temperature lag correction can be implemented by filtering the measured temperature by a digital filter with a response that mimics the thermal lag response of the spectral gamma ray detector. In the example illustrated in FIG. 8, a first order infinite impulse response (IIR) filter was used with filter coefficients experimentally derived.

FIGS. 9A-9D illustrate a gamma ray spectrum of the background radiation over long period of time while the sensor is thermally cycled, simulating a condition that may occur downhole. Due to statistical nature of the gamma ray radiation, an extended time of accumulation results in smoother spectrum, an effect well known to those skilled in the art. FIG. 94A shows counts versus energy for an integration time of 20 seconds at a counts per seconds (CPS) of 88.5. FIG. 94B shows counts versus energy for an integration time of 200 seconds at a CPS of 88.1. FIG. 94C shows counts versus energy for an integration time of 2000 seconds at a CPS of 89.1. FIG. 94D shows counts versus energy for an integration time of 20000 seconds at a CPS of 87.1. However, the temperature changes that occurred during the measurement time also blurred the peaks present in the background radiation as the values of the peak moving along the energy scale were averaged together.

Figure 10:
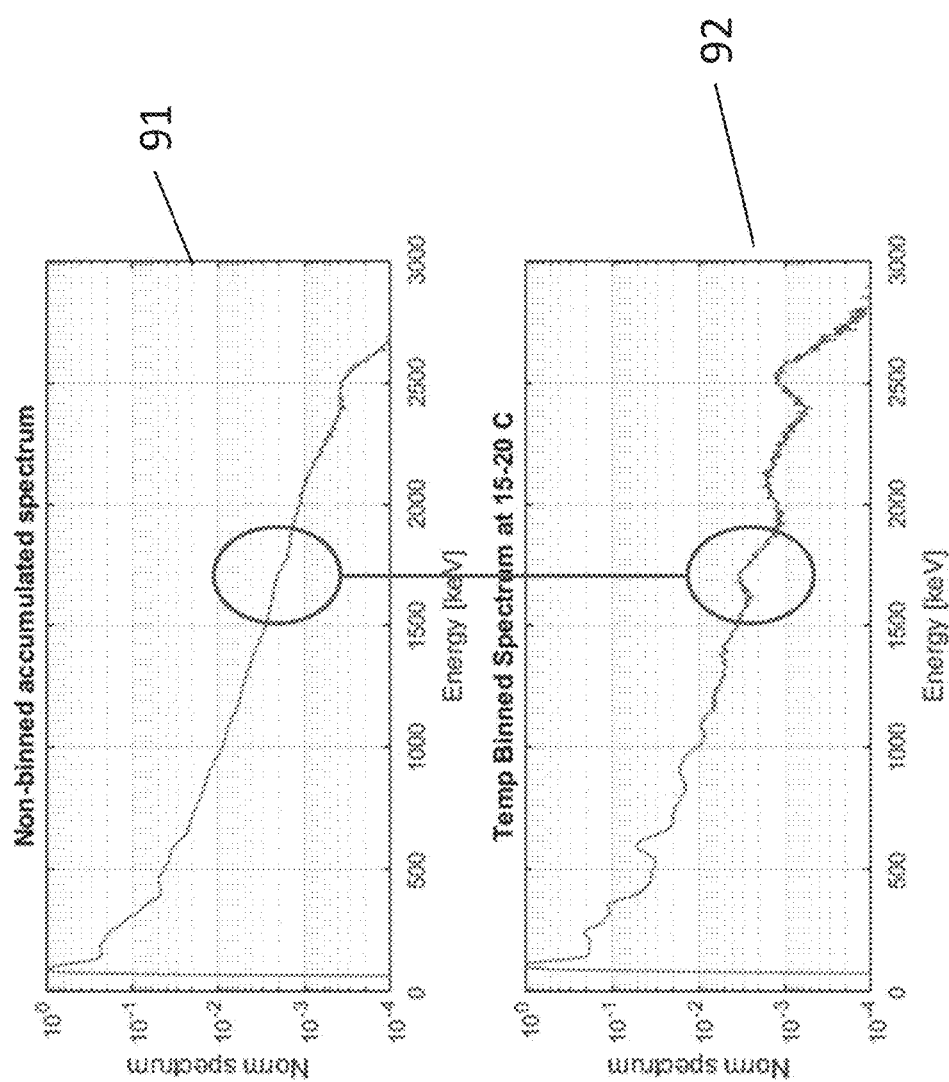
FIG. 10 illustrates an example of recovery of spectral detail in the process of temperature binning of acquired gamma ray spectra, in accordance with various embodiments.

FIG. 10 illustrates an example of recovery of spectral detail in the process of temperature binning of acquired gamma ray spectra. Graph 91 shows a smoothed non-binned accumulated spectrum with the presence of peak blurred in the smoothing process. By temperature binning the acquired gamma ray spectra, the peaks blurred during the measurement time can be recovered. This recovery can occur since the temperature binned spectrum only averages the spectra collected in a narrow temperature range, therefore reducing the spectrum smearing effect. Graph 92 shows a temperature binned spectrum that includes a peak at a location in the spectrum for which the presence of the peak was smoothed in graph 91.

Figure 11:
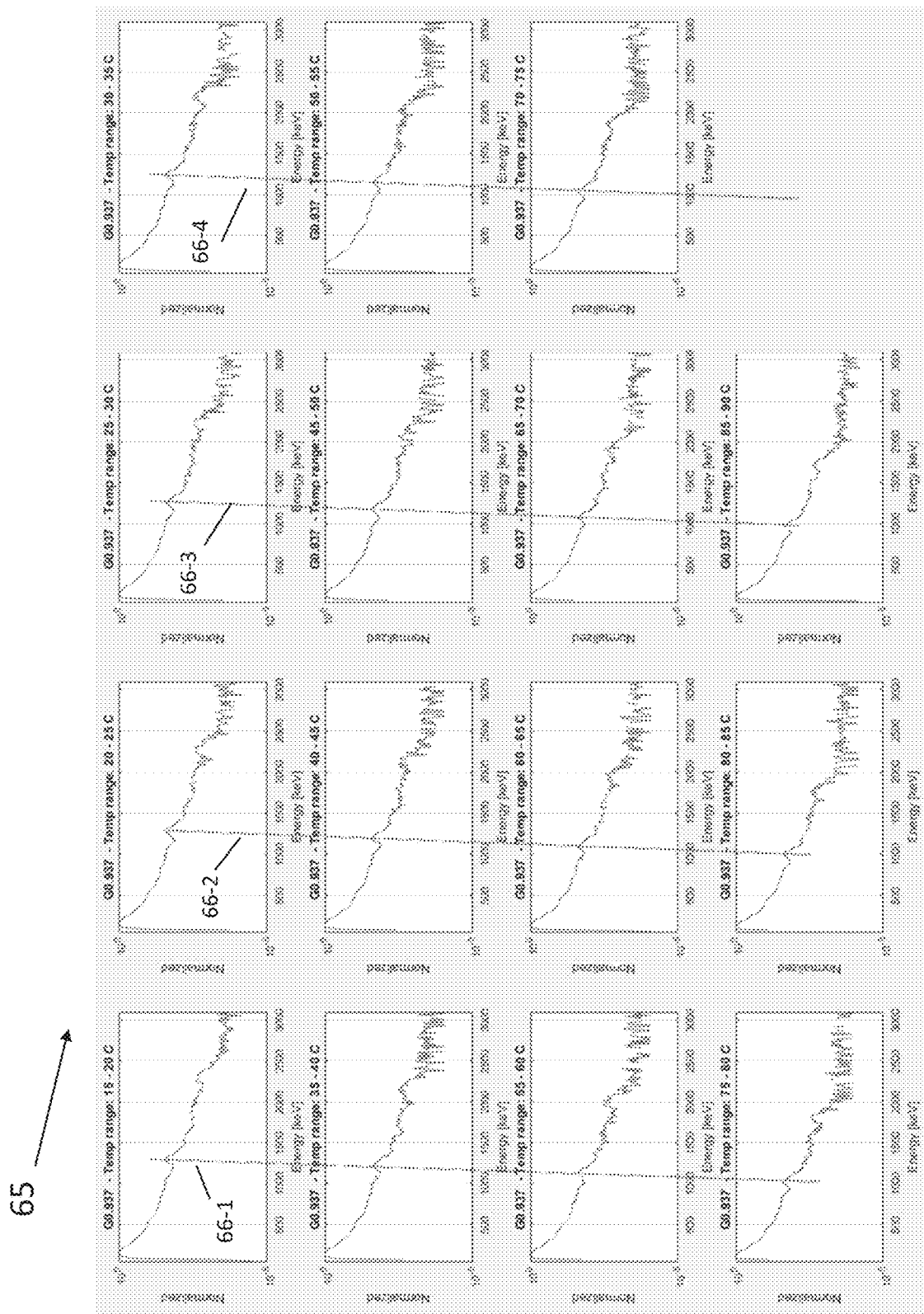
FIG. 11 illustrates a temperature binned calibration spectrum, in accordance with various embodiments.

FIG. 11 illustrates an embodiment of an example temperature binned calibration spectrum 65 acquired over a temperature range of 15 to 90° C. Temperature binned calibration spectrum 65 is similar in construct to temperature binned calibration spectrum 60 of FIG. 5 and temperature binned calibration spectrums 60-1, 60-2 . . . 60-N of FIG. 6. The lines 66-1, 66-2, 66-3, and 66-4 connect corresponding spectral peaks, which illustrates the reversible shift over temperature during the acquisition.

Figure 12:
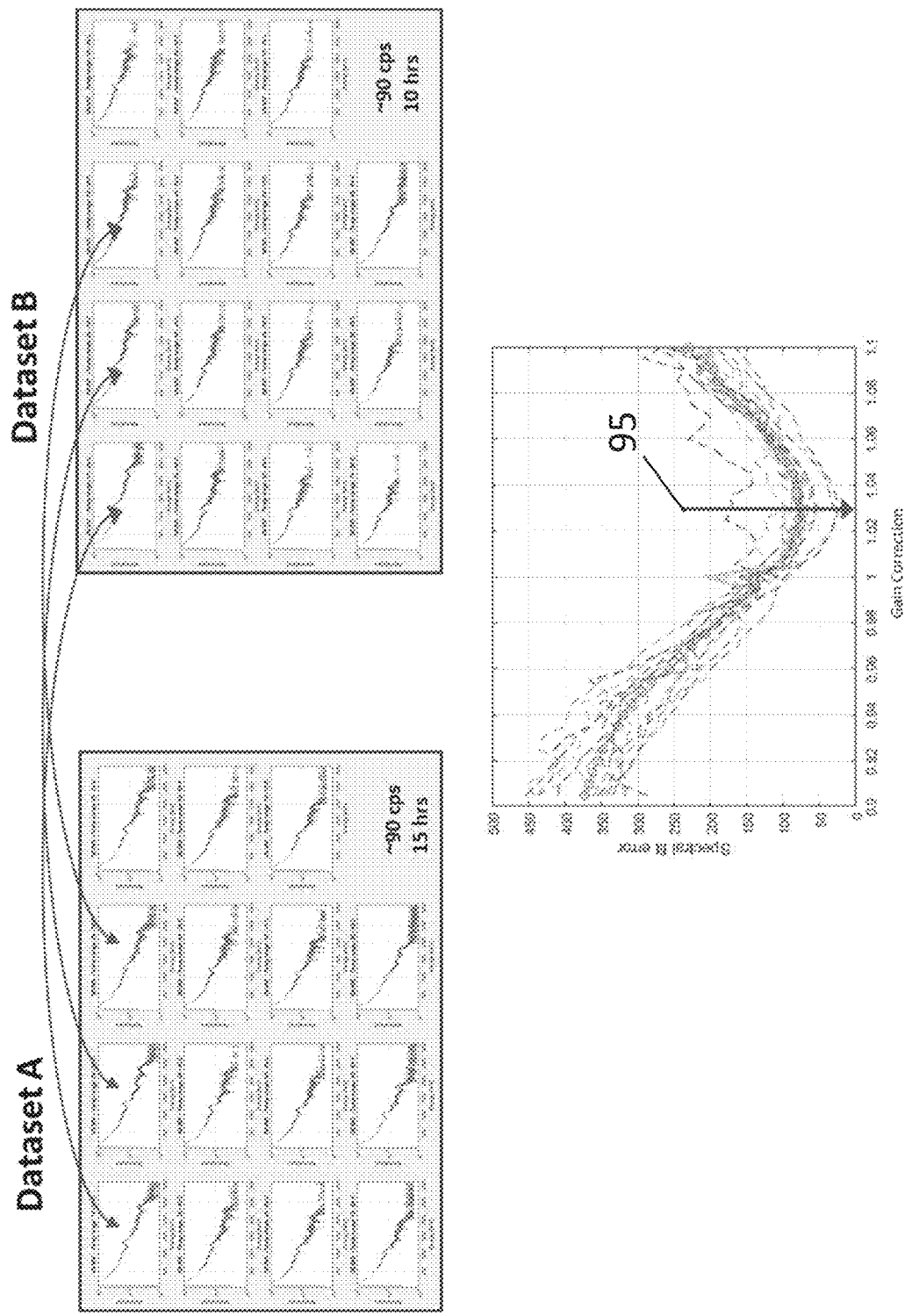
FIG. 12 illustrates a calibration dataset consisting of two temperature binned calibration spectra and the process of derivation of the long term irreversible change in detector sensitivity, in accordance with various embodiments.

FIG. 12 illustrates an embodiment of an example recovery of long term non-reversible drop in spectral gamma ray detector sensitivity. Calibration datasets can be compared from which long term irreversible change in spectral gamma ray detector sensitivity can be derived. In an embodiment, a comparison approach can include using two temperature binned calibration spectra shown as Dataset A and Dataset B in FIG. 12. In this example, Dataset A was acquired at approximately 90 CPS over 15 hours while the spectral gamma ray detector was temperature cycled in the natural background radiation. Subsequently, the gain of the spectral gamma ray detector was artificially reduced by 3% and Dataset B was acquired at approximately 90 CPS over 10 hours in the background radiation. The spectra of the two datasets were compared by correlation and a minimum misfit was achieved with the correction 95 of 1.03, which reflects that a 30% positive correction can be applied to reverse the induced gain change.

Multiple methods can be applied to compare gamma ray spectra in the two datatsets with common source elements. Individual peaks can be recovered from each gamma ray spectra in both datatsets and matched with respect to each other, for example peaks of thorium can be identified in all temperature binned energy spectra based on the shape of the spectrum and relative position of the peaks. Subsequent calculation of ratios of the matched peak amplitudes in spectra acquired in same temperature bins in Dataset A and Dataset B (FIG. 12) yields the measure of irreversible drift of the gamma ray detector sensitivity during the time that passed between acquisition of Dataset A and Dataset B. If a reference dataset acquired during factory calibration is used for Dataset A then the process described above will yield the measure of irreversible detector gain drift from the time of manufacturing. A singular value decomposition (SVD) method can be used to find the best fit of the measured spectrum and recover the gain shift in the process. A Levenberg-Marquardt (LM) method is another method that can be used for spectral analysis and is capable of recovery of gain shift between the two gamma ray spectra with common source elements. The results of such spectral analysis can be used to generate a lookup table for curve 82 of FIG. 7.

In the case of downhole logging, the gamma ray spectra are dominated by elements K, U, and Th along with their decay products, also known as daughter products. Due to long acquisition times, methods as taught herein can be very sensitive such that these methods can be able to detect trace contamination of a photomultiplier window of a spectral gamma ray detector with potassium, which in turn has a known trace concentration of radioactive isotope $K^{40}$. In an embodiment, only the $K^{40}$ peak is used for gain stabilization. Such contaminant can be introduced purposely at a level that is below a threshold concentration of K that would affect the accuracy of the measurement.

Figure 13:
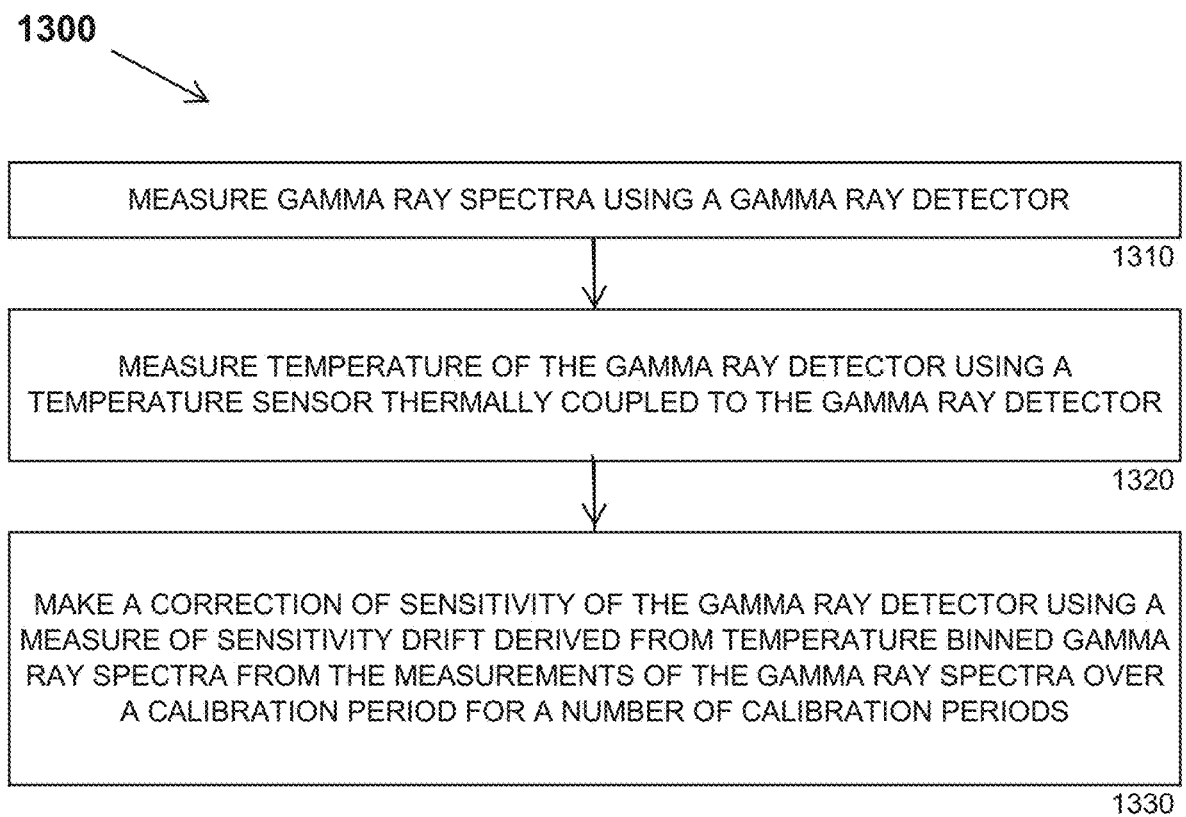
FIG. 13 is a flow diagram of features of an method of gamma ray downhole logging, in accordance with various embodiments.

FIG. 13 is a flow diagram of features of an example embodiment of an example method 1300 of gamma ray downhole logging. Method 700 can be implemented as a computer-implemented method using a memory storage device comprising instructions and one or more processors operatively in communication with the memory storage device, where the one or more processors execute instructions of the memory storage device. At 1310, gamma ray spectra are measured using a gamma ray detector. At 1320, temperature of the gamma ray detector is measured using a temperature sensor thermally coupled to the gamma ray detector. With the temperature sensor, thermally coupled to the gamma ray detector, for example, but not limited to, the temperature sensor attached to the side of the housing of the gamma ray detector, a temperature lag correction can be made to the data from the gamma ray detector to adjust for the difference between temperature inside the housing of the gamma ray detector and temperature outside the housing of the gamma ray detector.

At 1330, a correction of sensitivity of the gamma ray detector is made using a measure of sensitivity drift derived from temperature binned gamma ray spectra from the measurements of the gamma ray spectra over a calibration period for a number of calibration periods. A correction of reversible temperature effect of sensitivity of the gamma ray detector can be made using a temperature correction lookup table. The correction of reversible temperature effect of sensitivity of the gamma ray detector may be an initial correction of sensitivity of the gamma ray detector. The correction of reversible temperature effect can be made after an adjustment for a temperature lag between the gamma ray detector and the measuring temperature sensor.

Variations of method 1300 or methods similar to method 1300 can include a number of different embodiments that may be combined depending on the application of such methods and/or the architecture of systems in which such methods are implemented. Such methods can include recording the measured gamma ray spectra as histograms of gamma ray pulse counts versus amplitudes of recorded gamma ray pulses over a measurement period and recording calibration spectra as two-dimensional histograms of counts of the recorded gamma ray pulses versus the amplitudes of the pulses and sensor temperature over the calibration period. Such variations can include periodically calculating the measure of sensitivity drift while the system is logging downhole or calculating the measure of sensitivity drift by a surface acquisition system.

Variations of the method 1300 or methods similar to the method 1300 can include combining the gamma ray spectra with pre-determined calibration constants to obtain concentration of at least one naturally occurring radioactive element in a formation around a borehole with the gamma ray detector disposed in the borehole. Such variation can include calculating the measure of sensitivity drift by an analysis of a radiation peak of potassium 40 isotope present inside the gamma ray detector. In addition, features of methods associated with any of the FIGS. 1-12 and procedures as taught herein can be configured to be included in method 1300 or methods similar to method 1300.

In various embodiments, a non-transitory machine-readable storage device, such as computer-readable non-transitory media, can comprise instructions stored thereon, which, when executed by a set of processors associated with a system, cause the system to perform operations, where the operations comprise one or more features similar to or identical to features of methods and techniques described with respect to method 1300, variations thereof, and/or features of other methods taught herein such as associated with FIGS. 1-12. The physical structures of such instructions may be operated on by one or more processors. For example, executing these physical structures can cause the machine to perform operations comprising: measure gamma ray spectra using a gamma ray detector; measure the temperature of the gamma ray detector using a temperature sensor thermally coupled to the gamma ray detector; make a first correction of sensitivity of the gamma ray detector using a temperature correction lookup table; and make a second correction of sensitivity of the gamma ray detector using a measure of sensitivity drift derived from temperature binned gamma ray spectra from the measurements of the gamma ray spectra over a calibration period for a number of calibration periods.

Operations associated with conducting gamma ray downhole logging can include operations to make a correction of reversible temperature effect of sensitivity of the gamma ray detector using a temperature correction lookup table. Operations associated with conducting gamma ray downhole logging can also include operations include operations to record the measured gamma ray spectra as histograms of gamma ray pulse counts versus amplitudes of recorded gamma ray pulses over a measurement period and to record calibration spectra as two-dimensional histograms of counts of the recorded gamma ray pulses versus the amplitudes of the pulses and sensor temperature over the calibration period. Variations of such operations associated with method 1700 or methods similar to the method 1300 can include operations to combine the gamma ray spectra with predetermined calibration constants to obtain concentration of at least one naturally occurring radioactive element in a formation around a borehole with the gamma ray detector disposed in the borehole.

Further, machine-readable storage devices, such as computer-readable non-transitory media, herein, are physical devices that store data represented by physical structure within the respective device. Such a physical device is a non-transitory device. Examples of machine-readable storage devices can include, but are not limited to, read only memory (ROM), random access memory (RAM), a magnetic disk storage device, an optical storage device, a flash memory, or other electronic, magnetic, and/or optical memory devices. The machine-readable device may be a machine-readable medium such as memory 25 of FIG. 1. Terms such as "memory," "memory module," "machine-readable medium," "machine-readable device," and similar terms should be taken to include all forms of storage media, either in the form of a single medium (or device) or multiple media (or devices), in all forms. Terms such as "memory," "memory module," "machine-readable medium," and "machine-readable device," shall be taken to include any tangible non-transitory medium which is capable of storing or encoding a sequence of instructions for execution by a machine and that cause a machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A gamma ray downhole logging system comprising:
a gamma ray detector to measure gamma ray spectra;
a temperature sensor to measure the temperature of the gamma ray detector;
one or more processors;
a memory having stored instructions, executable by the one or more processors, to perform operations, the operations including operations to make a correction of sensitivity of the gamma ray detector using a measure of sensitivity drift derived from temperature binned gamma ray spectra from measurements of the gamma ray spectra by the gamma ray detector over a calibration period for a number of calibration periods, including determining a change in the gamma ray spectrum between multiple temperature bins with each temperature bin assigned a range of temperatures.

2. The system of claim 1, wherein the operations include operations to make a correction of reversible temperature effect of sensitivity of the gamma ray detector using a temperature correction lookup table.

3. The system of claim 1, wherein the operations include operations to:
record the measured gamma ray spectra as histograms of gamma ray pulse counts versus amplitudes of recorded gamma ray pulses over a measurement period; and
record calibration spectra as two-dimensional histograms of counts of the recorded gamma ray pulses versus the amplitudes of the pulses and sensor temperature over the calibration period.

4. The system of claim 3, wherein the memory includes a non-volatile memory to store data for the histograms.

5. The system of claim 1, where the system includes a communication interface to provide real time communication of the gamma ray spectra to a surface acquisition system.

6. The system of claim 1, wherein the system is a logging while drilling tool.

7. The system of claim 1, wherein the system is a wireline logging tool.

8. The system of claim 1, wherein the operations include operations to periodically calculate the measure of sensitivity drift derived from temperature binned gamma ray spectra while the system is logging downhole.

9. The system of claim 1, wherein the operations include operations to calculate the measure of sensitivity drift derived from temperature binned gamma ray spectra by a surface acquisition system.

10. The system of claim 1, wherein the operations include operations to combine the gamma ray spectra with predetermined calibration constants to obtain concentration of at least one naturally occurring radioactive element in a formation around a borehole with the gamma ray detector disposed in the borehole.

11. The system of claim 10, wherein the concentration of the at least one naturally occurring radioactive element is a measurement as a function of depth within the borehole.

12. The system of claim 10, wherein the concentration of the at least one naturally occurring radioactive element is a measurement as a function of azimuthal sector around the borehole.

13. The system of claim 1, wherein the operations include operations to calculate the measure of sensitivity drift by an analysis of a radiation peak of potassium 40 isotope present inside the gamma ray detector.

14. A method of gamma ray downhole logging comprising:
measuring gamma ray spectra using a gamma ray detector;
measuring temperature of the gamma ray detector using a temperature sensor thermally coupled to the gamma ray detector;
counting each gamma ray induced pulse of the measured gamma ray spectra in a bin that corresponds to pulse amplitude of the respective gamma ray induced pulse and respective measured temperature within a temperature range, providing a temperature binned gamma ray spectra; and
making, using one or more processors, a correction of sensitivity of the gamma ray detector using a measure of sensitivity drift derived from the temperature binned gamma ray spectra from the measurements of the gamma ray spectra over a calibration period for a number of calibration periods.

15. The method of claim 14, wherein the method includes making, using one or more processors, a correction of reversible temperature effect of sensitivity of the gamma ray detector using a temperature correction lookup table.

16. The method of claim 14, wherein the method includes:
recording the measured gamma ray spectra as histograms of gamma ray pulse counts versus amplitudes of recorded gamma ray pulses over a measurement period; and
recording calibration spectra as two-dimensional histograms of counts of the recorded gamma ray pulses versus the amplitudes of the pulses and sensor temperature over the calibration period.

17. The method of claim 14, wherein the method includes periodically calculating the measure of sensitivity drift while the system is logging downhole or calculating the measure of sensitivity drift by a surface acquisition system.

18. The method of claim 14, wherein the method includes combining the gamma ray spectra with pre-determined calibration constants to obtain concentration of at least one naturally occurring radioactive element in a formation around a borehole with the gamma ray detector disposed in the borehole.

19. The method of claim 14, wherein the method includes calculating the measure of sensitivity drift by an analysis of a radiation peak of potassium 40 isotope present inside the gamma ray detector.

20. A non-transitory machine-readable storage device comprising instructions, which, when executed by a set of processors, cause a system to perform operations, the operations comprising operations to:
measure gamma ray spectra using a gamma ray detector;
measure the temperature of the gamma ray detector using a temperature sensor thermally coupled to the gamma ray gamma ray detector;
count each gamma ray induced pulse of the measured gamma ray spectra in a bin that corresponds to pulse amplitude of the respective gamma ray induced pulse and respective measured temperature within a temperature range, providing a temperature binned gamma ray spectra; and
make a correction of sensitivity of the gamma ray detector using a measure of sensitivity drift derived from the temperature binned gamma ray spectra from measurements of the gamma ray spectra by the gamma ray detector over a calibration period for a number of calibration periods.

21. The non-transitory machine-readable storage device of claim 20, wherein the operations include operations to make a correction of reversible temperature effect of sensitivity of the gamma ray detector using a temperature correction lookup table.

22. The non-transitory machine-readable storage device of claim 20, wherein the operations include operations to:
record the measured gamma ray spectra as histograms of gamma ray pulse counts versus amplitudes of recorded gamma ray pulses over a measurement period; and
record calibration spectra as two-dimensional histograms of counts of the recorded gamma ray pulses versus the amplitudes of the pulses and sensor temperature over the calibration period.

23. The non-transitory machine-readable storage device of claim 20, wherein the operations include operations to combine the gamma ray spectra with pre-determined calibration constants to obtain concentration of at least one naturally occurring radioactive element in a formation around a borehole with the gamma ray detector disposed in the borehole.

\* \* \* \* \*

UNITED STATES PATENT AND TRADEMARK OFFICE
CERTIFICATE OF CORRECTION

| | |
|---|---|
| PATENT NO. | : 10,670,736 B2 |
| APPLICATION NO. | : 16/104451 |
| DATED | : June 2, 2020 |
| INVENTOR(S) | : Marian Morys |

It is certified that error appears in the above-identified patent and that said Letters Patent is hereby corrected as shown below:

In the Claims

Column 13, Line 31, please delete "coupled to the gamma ray gamma ray detector;", and insert --coupled to the gamma ray detector;--

Signed and Sealed this
Twenty-third Day of August, 2022

*Katherine Kelly Vidal*

Katherine Kelly Vidal
*Director of the United States Patent and Trademark Office*